United States Patent
Denlinger et al.

(10) Patent No.: US 8,011,601 B2
(45) Date of Patent: Sep. 6, 2011

(54) DISPERSION LANCE FOR DISPERSING A TREATING AGENT INTO A FLUID STREAM

(75) Inventors: Mark A. Denlinger, Leander, TX (US); Jim Noblett, Austin, TX (US); Scott D. Miller, Austin, TX (US)

(73) Assignee: URS Corporation, San Francisco, CA (US)

( * ) Notice: Subject to any disclaimer, the term of this patent is extended or adjusted under 35 U.S.C. 154(b) by 756 days.

(21) Appl. No.: 12/152,654

(22) Filed: May 15, 2008

(65) Prior Publication Data
US 2008/0296399 A1 Dec. 4, 2008

Related U.S. Application Data

(60) Provisional application No. 60/930,703, filed on May 18, 2007.

(51) Int. Cl.
*B05B 7/06* (2006.01)

(52) U.S. Cl. .......... 239/10; 239/429; 239/432; 261/115; 366/101; 366/167.1; 366/174.1; 366/337; 366/338; 366/340

(58) Field of Classification Search .............. 239/10, 239/429, 432; 261/115; 366/101, 167.1, 366/174.1, 337, 338, 340
See application file for complete search history.

(56) References Cited

U.S. PATENT DOCUMENTS

| | | | |
|---|---|---|---|
| 3,879,021 A * | 4/1975 | Riley | 366/137.1 |
| 4,164,375 A | 8/1979 | Allen | |
| 4,466,100 A | 8/1984 | Broadwell | |
| 4,498,786 A | 2/1985 | Ruscheweyh | |
| 4,527,903 A | 7/1985 | Ruscheweyh | |
| 4,564,298 A * | 1/1986 | Gritters et al. | 366/173.2 |
| 4,633,909 A * | 1/1987 | Louboutin et al. | 137/888 |
| 4,753,535 A * | 6/1988 | King | 366/337 |
| 4,899,772 A | 2/1990 | Rao | |
| 5,308,043 A | 5/1994 | Floyd et al. | |
| 5,456,533 A | 10/1995 | Streiff et al. | |
| 5,667,582 A | 9/1997 | Ziegler et al. | |
| 5,839,828 A | 11/1998 | Glanville | |
| 5,866,910 A | 2/1999 | Cooke et al. | |
| 6,135,629 A * | 10/2000 | Dohmann | 366/181.5 |
| 6,245,285 B1 | 6/2001 | Dry et al. | |
| 6,398,842 B2 | 6/2002 | Dunne | |
| 6,989,126 B2 | 1/2006 | Leigh | |
| 7,383,850 B2 * | 6/2008 | Buzanowski et al. | 137/1 |

(Continued)

*Primary Examiner* — Duane Smith
*Assistant Examiner* — Christopher P Jones
(74) *Attorney, Agent, or Firm* — Klauber & Jackson LLC

(57) ABSTRACT

A dispersion lance is for use in combination with a fluid treatment system of the type which includes a flow duct in which a fluid stream is mixed with a treating agent. The dispersion lance includes a pipe mounted in the duct with its axis approximately transverse to the direction of the fluid stream flow, the pipe having a series of openings along its length for injecting a treating agent into the fluid stream. A baffle extends lengthwise along the pipe, the baffle having a cross-section the central portion of which is V-shaped, with the apex of the V facing upstream of the fluid stream flow, and with generally flattened wing portions extending from the legs of the V beyond the sides of the pipe in a direction where they transversely intersect the stream flow. The baffle acts to generate a low pressure zone on its downstream side which enhances turbulence in the fluid. The orifices of the pipe are located to inject the treating agent into the low pressure zone to better distribute and intermix the injected treating agent into the surrounding fluid.

26 Claims, 9 Drawing Sheets

U.S. PATENT DOCUMENTS

| | | | |
|---|---|---|---|
| 7,770,564 B2 * | 8/2010 | Emerick et al. | 123/568.17 |
| 7,896,264 B2 * | 3/2011 | Eicher et al. | 239/590 |
| 2002/0031046 A1 * | 3/2002 | Schneider et al. | 366/181.5 |
| 2010/0243953 A1 * | 9/2010 | Livshits | 252/182.11 |

* cited by examiner

Prior Art Lance Particle Tracks – Plan View

Invention Dispersion Lance Particle Tracks – Plan View

Fig. 9

DISPERSION LANCE FOR DISPERSING A TREATING AGENT INTO A FLUID STREAM

RELATED APPLICATION

This application claims priority from U.S. Provisional Application No. 60/930,703 filed May 18, 2007.

FIELD OF INVENTION

This invention relates generally to apparatus and methods for fluid treatment, and more specifically relates to apparatus for injecting a treating agent into a fluid stream while generating enhanced fluid phase turbulence to better distribute and intermix the injected treating agent into the surrounding fluid.

BACKGROUND OF INVENTION

During the course of treating an acid or other gas, in order for example to control the atmospheric emission of polluting contaminants such as sulfur oxides, it is common as one step of the process to disperse solid particles of a treating agent such as a carbonate into the gas in order to react with or adsorb the undesired component. In order to do this a dispersion lance or other device or collection of devices may be used, the function of which is to disperse the solid particles of treating agent into the gaseous stream. Nozzles or collections of particle ejection nozzles can be used for this purpose. Since, however, simple ejection of the particles from such nozzles is not very effective in generating thorough mixing of the particles with the gas stream, it is also known to use baffles, usually positioned directly downstream of the injection point to encourage turbulence, thereby enhancing the mixing of particles with the gas stream. These prior devices and apparatus arrangements, however, have been of only limited efficacy, often because the turbulence generated has not been effective enough to break up the ejected particle streams, which to the contrary are commonly found when examined to advance from their injection points as rather distinct linear streams as they move into the surrounding ambient gas stream. Accordingly, a need has existed for an injection lance and baffle construction which is fully able to produce the highly turbulent conditions required for full and effective dispersion and mixing into the gas stream of the injected particles of the treating agent.

Similar considerations as described above for the case of injection of solid particles into a gas flow, arise where an injection lance and baffle construction is used for injecting liquids or gaseous treating agents into a fluid flow of a gas, or injection of solid particles, liquids, or gases into a flow of a liquid phase.

SUMMARY OF INVENTION

Now in accordance with the present invention, a dispersion lance is provided for use in combination with a fluid treatment system of the type which includes a flow duct in which a fluid stream is mixed with a treating agent. The dispersion lance includes a pipe mounted in the duct with its axis approximately transverse to the direction of the fluid stream flow, the pipe having a series of openings along its length for injecting a treating agent supplied to the pipe into the fluid stream. A baffle extends lengthwise along the pipe, the baffle having a cross-section the central portion of which is V-shaped, with the apex of the V facing upstream of the fluid stream flow, and with generally flattened wing portions extending from the legs of the V beyond the sides of the pipe in a direction where they transversely intersect the stream flow. The baffle acts to generate a low pressure zone on its downstream side which enhances turbulence in the fluid. The orifices of the pipe are located to inject the treating agent into the low pressure zone to better distribute and intermix the injected treating agent into the surrounding fluid.

The wings of the baffle form an angle of less than 180° with respect to the legs of the central portion, and the apex of the central portion V generally subtend an angle of from about 30 to 135°, with an angle of about 90° being typical. The wings can have a generally rectangular shape, and may be provided with notches on their trailing edge.

In a typical application as will be described below, the invention is applicable to the case of injection of solid particles into a gas flow. However the invention is also applicable to the environments where an injection lance and baffle construction is to be used for injecting liquids or gaseous treating agents into a gaseous flow; or where an injection lance and baffle construction is to be used for injection of solid particles, or liquids or gases, into a flow of a liquid phase.

BRIEF DESCRIPTION OF DRAWINGS

The invention is diagrammatically illustrated, by way of example, in the drawings appended hereto, in which:

FIGS. 1 and 1A are respectively plan and schematic transverse sectional views of a typical prior art dispersion lance, which is positioned in a duct carrying a gas stream which is being treated with a particulate injected from the lance;

FIGS. 2 and 2A are respectively plan and schematic transverse sectional views of a dispersion lance and baffle in accordance with the invention, which are positioned in a duct carrying a gas stream which is being treated with a particulate ejected from the lance;

FIG. 9 is a schematic top plan view illustrating the lance particle tracks for the apparatus of the invention shown in FIGS. 2 and 2A.

DESCRIPTION OF PREFERRED EMBODIMENT

Figure 1:
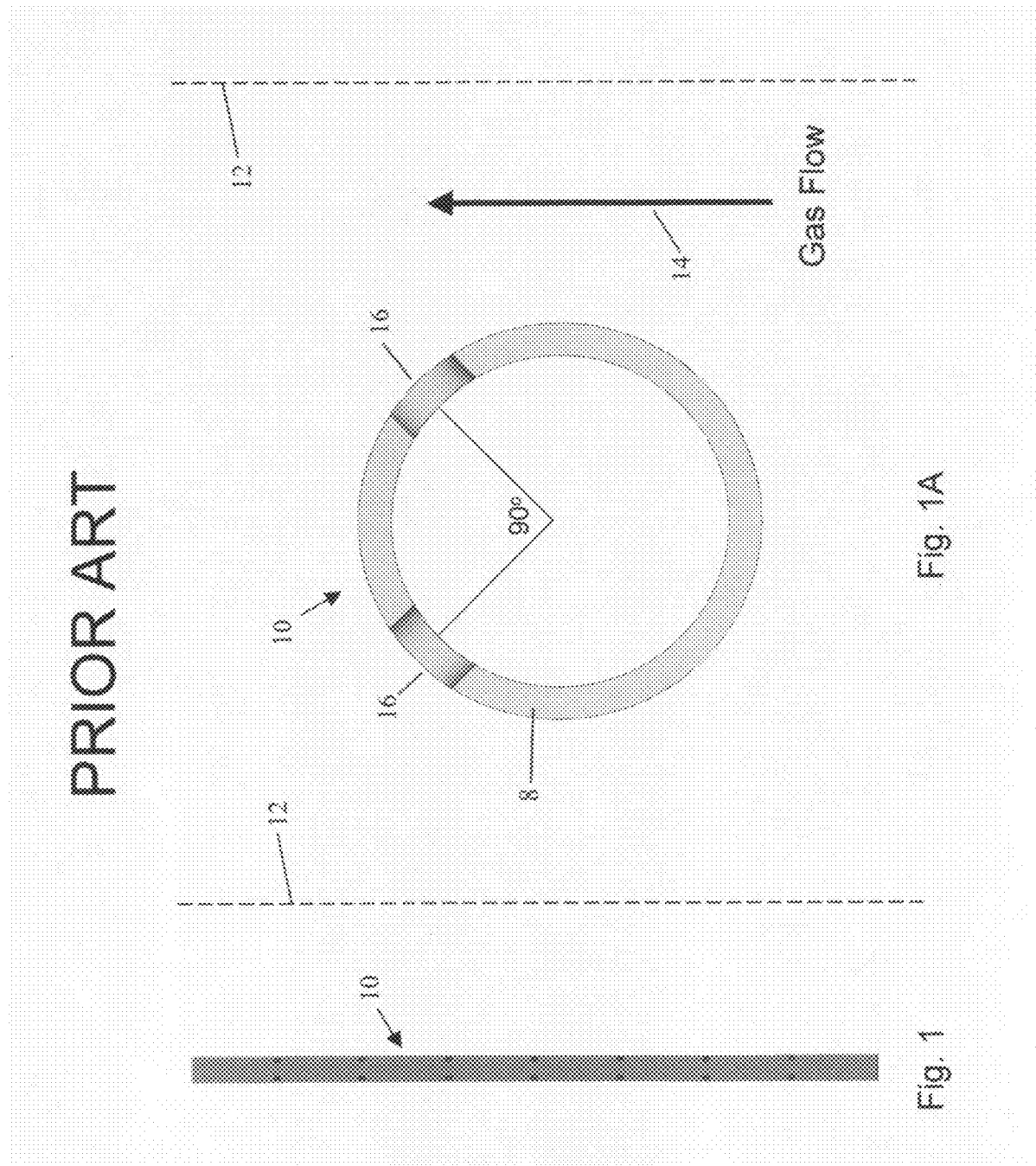

In FIGS. 1 and 1A plan and schematic transverse sectional views of a typical prior art dispersion lance 10, which is positioned in a duct 12 carrying a gas stream flow 14 which is being treated with a particulate ejected from the lance. The position of the lance within duct 12 is not shown to scale; rather the duct 12 and its actual wall spacing from lance 10 is merely intended to be suggested by the dotted lines used here--and as well in FIG. 2A. Also while dimensions and certain angles are shown in FIGS. 1, 1A, 2 and 2A, these are cited for illustration only and are not in any way intended to be limiting of the invention. The lance 10 comprises a pipe 8 which is mounted in duct 12 by means not shown. Pipe 8 has two parallel lines of openings 16 along its length. As seen in FIG. 1A the parallel lines of openings 16 are at the downstream facing side of pipe 8, and are oriented so that axial openings in opposed lines are at an angle of about 90° with respect to each other. The particulate treating agent to be dispersed into the flowing gas stream 14 is provided to pipe 8 and the particles are then injected into the gas stream from openings 16. A pressurized carrier gas can be provided to pipe 8 with the particles to enable their ejection, or other means can be used to generate forces for ejection of the particles.

Figure 2:
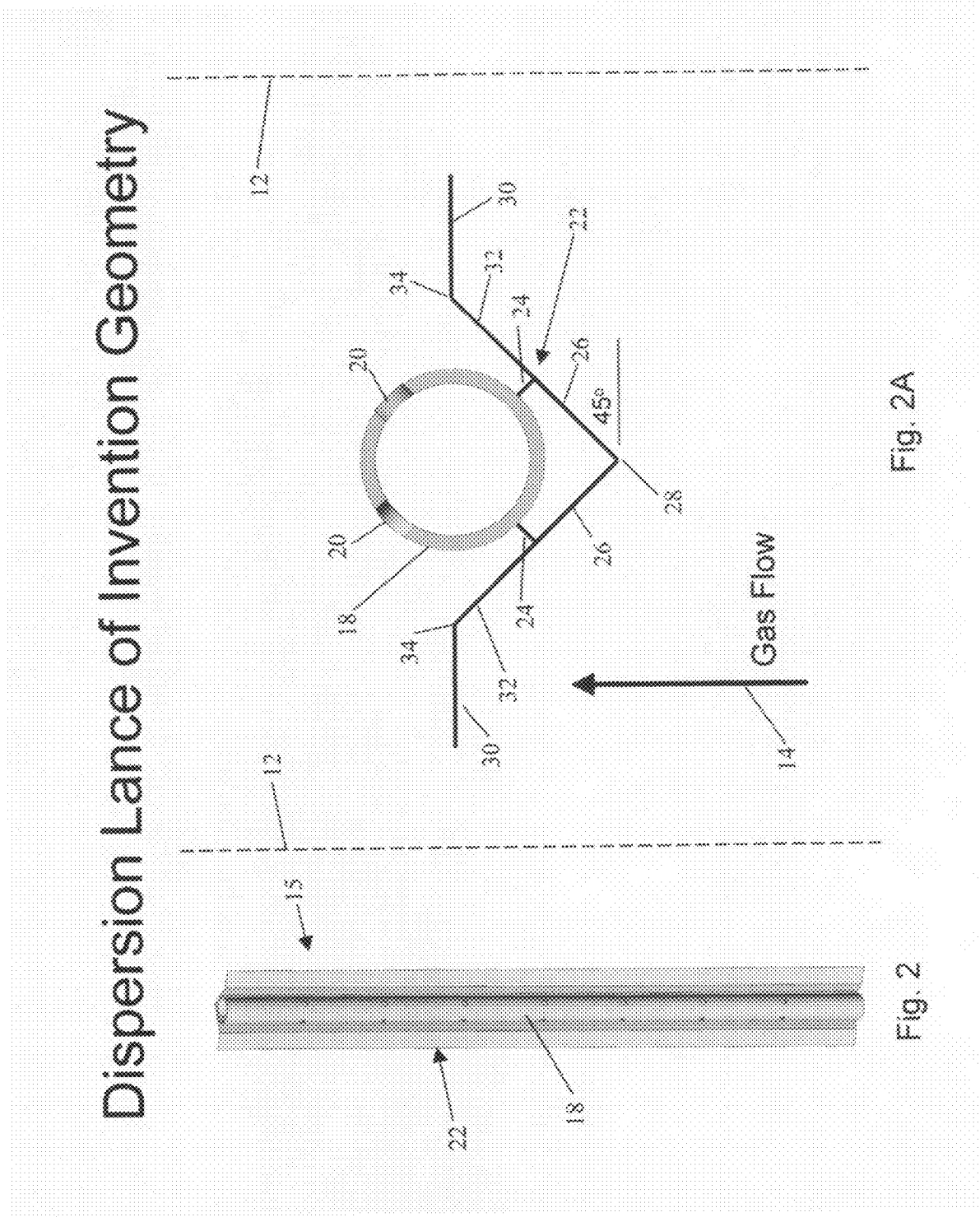

In FIGS. 2 and 2A plan and schematic transverse sectional views appear of a dispersion lance and baffle in accordance with the invention, which are similarly positioned in a duct 12 carrying a gas stream which is being treated with a particulate ejected from the lance. The pipe 18 is substantially similar to pipe 8 of FIGS. 1 and 1A, and is again provided with openings or orifices 20 arranged along two parallel lines extending along pipe 18. However unlike the prior art device, pipe 18 is associated with a baffle 22, which is mounted in any convenient manner in duct 12, including by being affixed to pipe 18 by supports 24. Pipe 18 and baffle 22 can be positioned in a vertical or horizontal orientation in duct 12, or otherwise depending on requirements and on duct geometry. Baffle 22 extends lengthwise along pipe 18, and has a cross-section the central portion 26 of which is V-shaped, with the apex 28 of the V facing upstream of the gas stream flow 14, and with generally flattened wing portions 30 extending from the legs 32 of the V beyond the lateral sides of pipe 18 in a direction where they transversely intersect the gas stream flow 14. The apex 28 of the V subtends an angle of about 90°, but more generally can be in the range of from about 30 to 135°. Wing portions 30 are seen to also define a second V 34 with the legs 32. The included angle of second V 34 should be less than 180°. Wing portions 30 are typically flat rectangles as seen in FIG. 2, but they can also be modified, as for example by being provided with notches of various shapes on their trailing edges.

As will be better appreciated from the following studies, all of which were generated via Computational Fluid Dynamics modeling (CFD), the baffle 22 acts to markedly enhance gas phase turbulence to thereby better distribute the injected particles into the surrounding gas flow.

The CFD Modeling basis in the studies was as follows:

| Modeled single vertical lance in a duct 4 ft-6 in tall and 4 ft-0 in wide. | |
|---|---|
| Total Gas Flow = | 60,000 acfm. |
| Average Gas Velocity in Duct = | 55.6 ft/sec |
| Gas Temperature = | 316° F. |
| Solids Particle Size Distribution | |
| Mean 21.6 micron | |
| Median 18.9 micron | |
| Divided into 6 discrete sizes: | |
| 1 micron | 5% |
| 3 micron | 5% |
| 11 micron | 40% |
| 30 micron | 40% |
| 46 micron | 5% |
| 87 micron | 5% |

| Modeled single vertical lance in a duct 4 ft-6 in tall and 4 ft-0 in wide. | |
|---|---|
| Carrier Air Flow per Lance = | 30 scfm |
| Solids Injection Rate per Lance = | 0.5 lb/hr |

Figure 3:
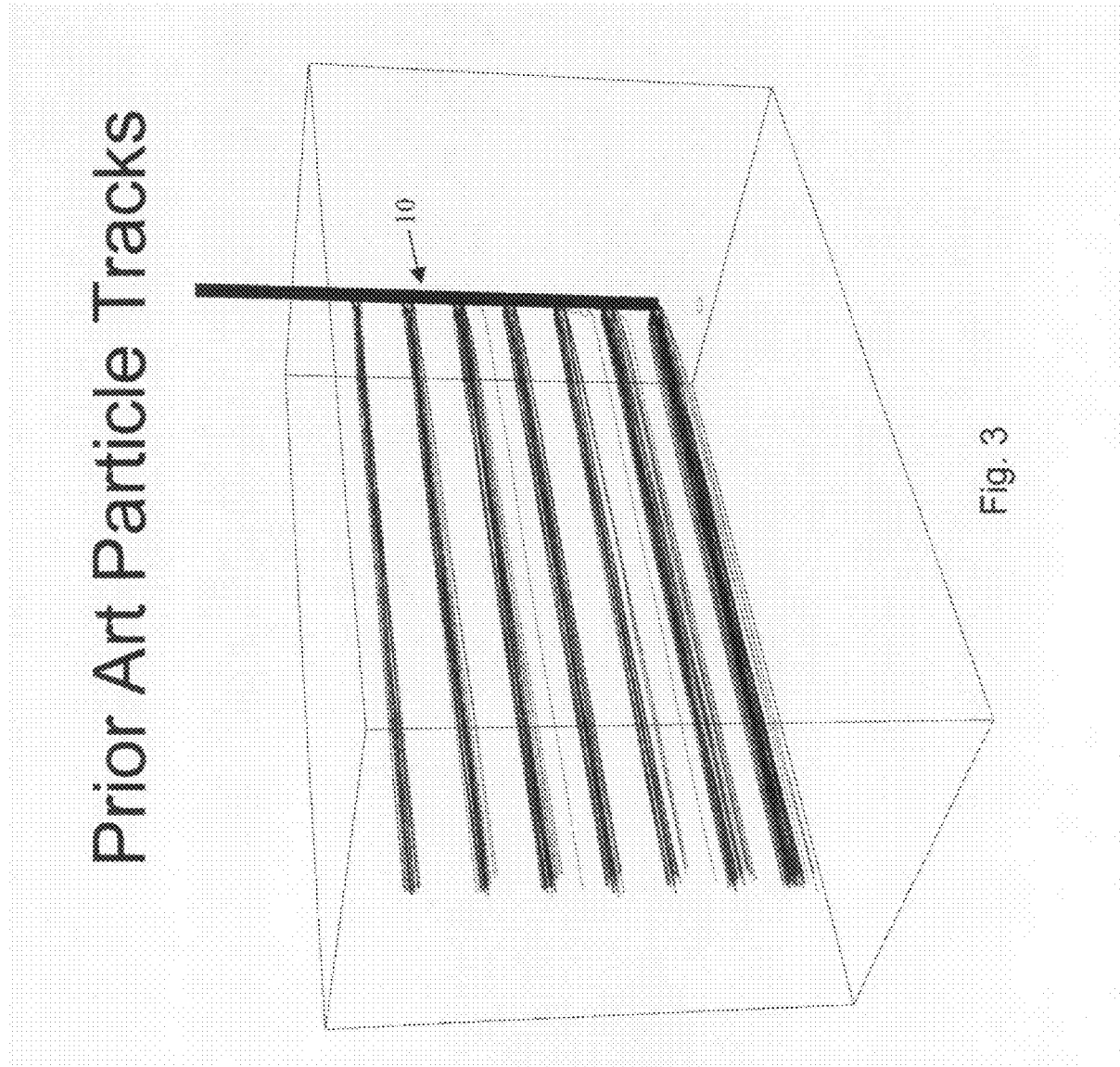
FIG. 3 is a schematic broken-away perspective view showing typical particle tracks enabled by the prior art apparatus of FIGS. 1 and 1A.
Figure 4:
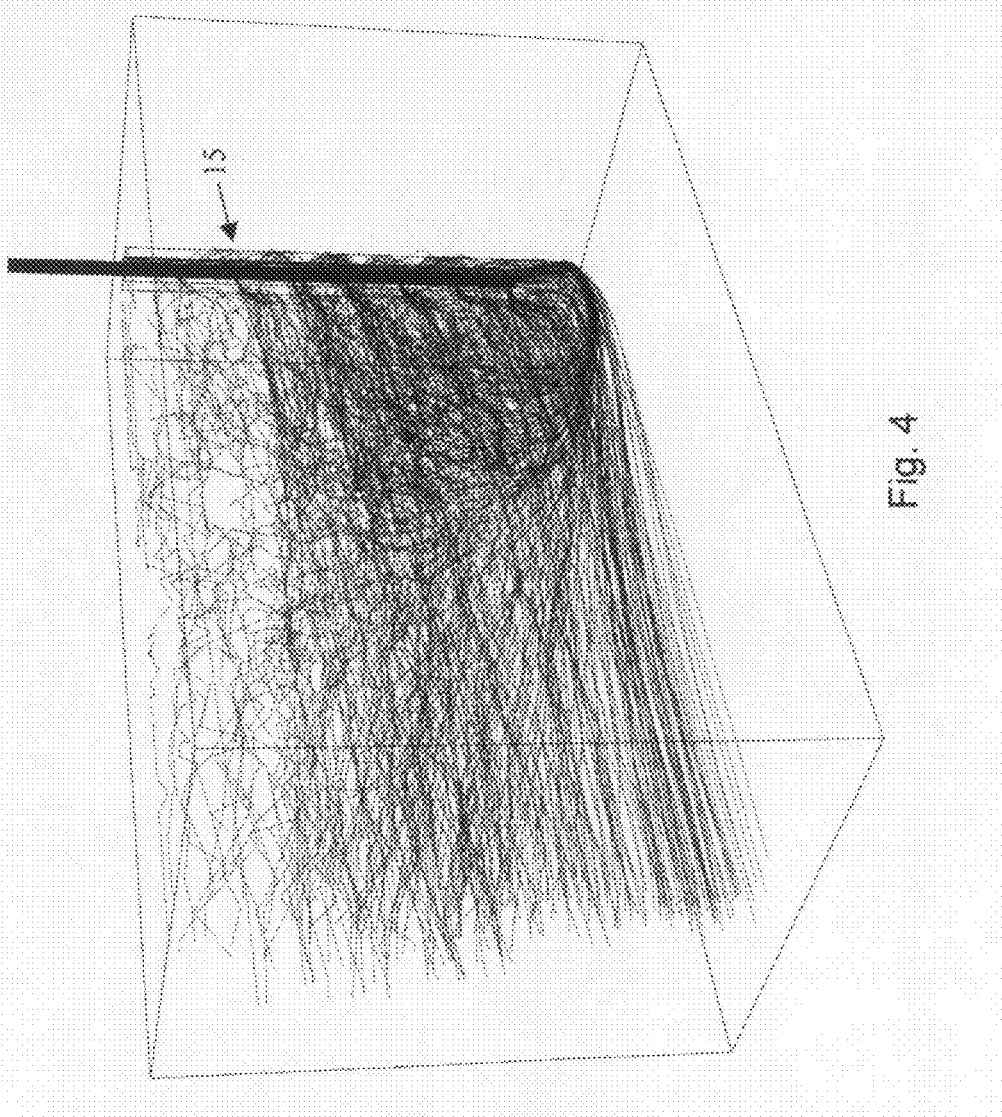
FIG. 4 is a schematic broken-away perspective view showing typical particle tracks enabled by the apparatus of the invention as shown in FIGS. 2 and 2A.
Figure 5:
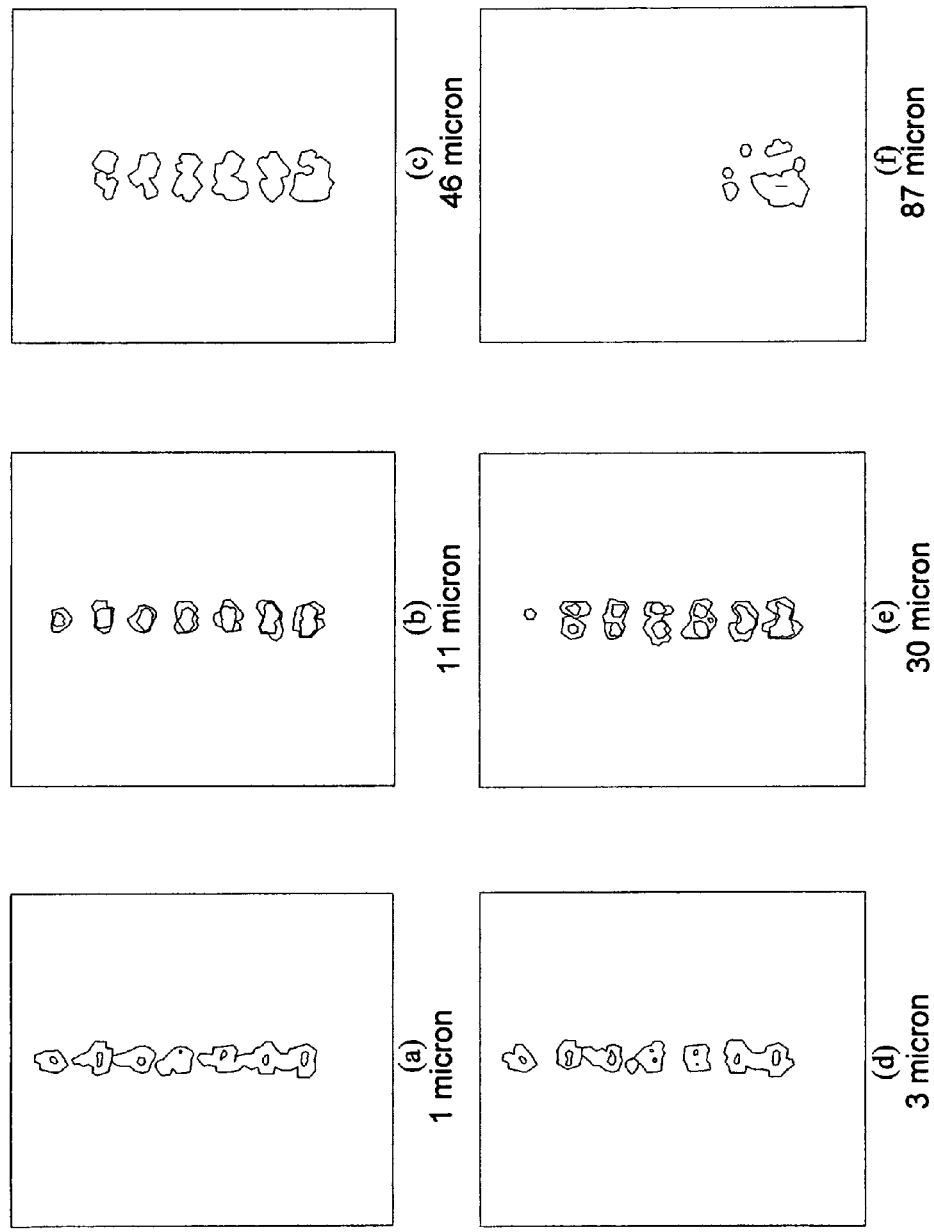
FIGS. 5(a) through 5(f) schematically depict cross-sectional views taken 7 ft downstream from the prior art lance of FIGS. 1 and 1A, and show distribution of the ejected particles by size at the said downstream position.
Figure 6:
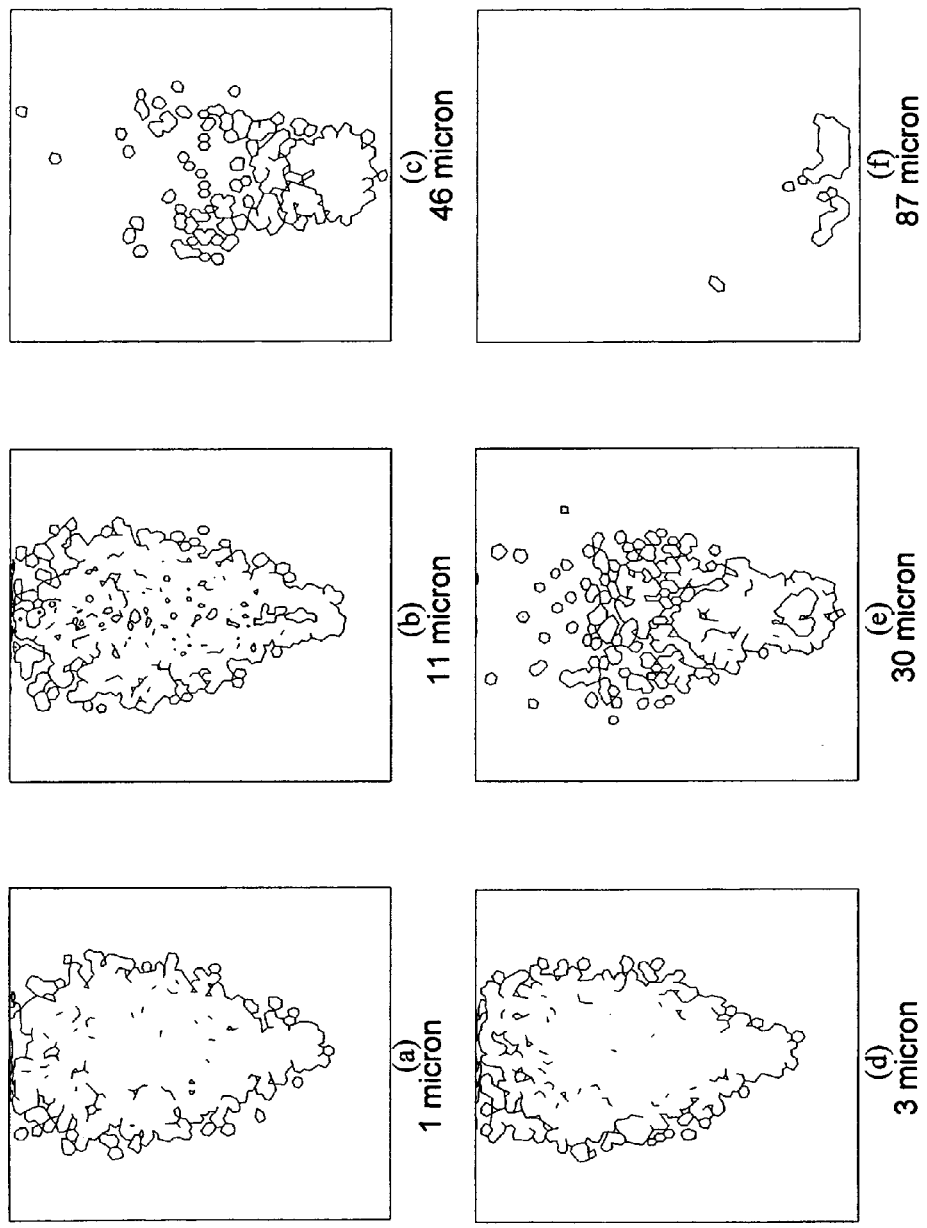
FIGS. 6(a) through 6(f) schematically depicts cross-sectional views taken 7 ft downstream from the apparatus of the invention as in FIGS. 2 and 2A, and shows the distribution of the ejected particles by sizes at the said downstream position.
Figure 7:
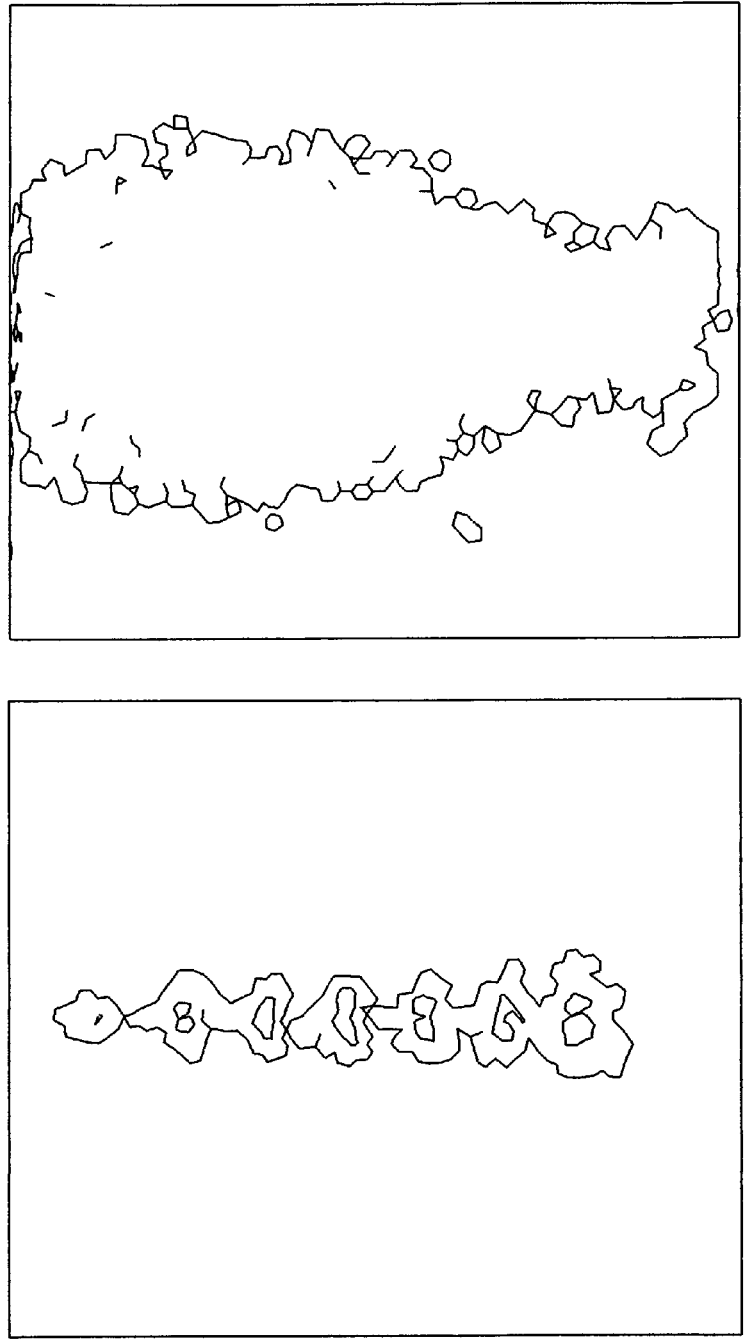
FIG. 7 schematically depicts cross-sectional views taken 7 ft downstream from the prior art lance of FIGS. 1 and 1A, and from the apparatus of the invention as in FIGS. 2 and 2A, and shows for each the particle distribution of the ejected particles of all particle sizes at the said downstream position.
Figure 8:
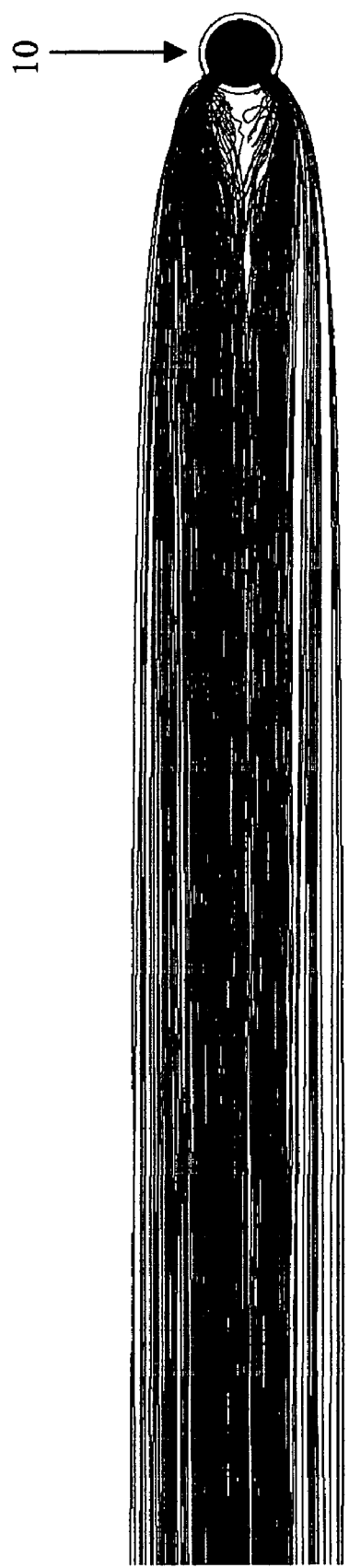
FIG. 8 is a schematic top plan view illustrating the lance particle tracks for the prior art lance of FIGS. 1 and 1A.

Thus in FIG. 3 a schematic broken-away perspective view shows typical particle tracks enabled by the prior art apparatus of FIGS. 1 and 1A. This is to be compared with the FIG. 4 schematic broken-away perspective view, which shows typical particle tracks enabled by the apparatus of the invention of FIGS. 2 and 2A. It will be evident that the prior art arrangement results in the ejected particles moving downstream in narrow distinct, confined and separated bands or columns. Increasing the amount of energy used to eject the particles pushes particles further out from the lance, but still results in columns of particles in the gas path. In contrast, the present invention by generating increased gas turbulence and recirculation downstream of the lance, rapidly produces a highly intermixed and dispersed cloud of particles, and indeed one that becomes more spread out and dispersed in the surrounding gas as one proceeds in the downstream direction.

FIGS. 5(*a*) through 5(*f*) schematically depict cross-sectional views taken 7 ft downstream from the prior art lance of FIGS. 1 and 1A, and show distribution of the ejected particles by size at the said downstream position. This is to be compared with FIGS. 6(*a*) through 6(*f*) which schematically depict cross-sectional views taken 7 ft downstream from the apparatus of the invention as in FIGS. 2 and 2A, and which similarly shows distribution of the ejected particles by size at the downstream position.

FIG. 7 schematically depicts at the left side, a cross-sectional view taken 7 ft downstream from the prior art lance of FIGS. 1 and 1A, and shows the distribution of the ejected particles of all particle sizes at the said downstream position. This is to be compared with the schematic at the right side of the Figure showing the same cross-sectional view taken 7 ft downstream from the apparatus of the invention as in FIGS. 2 and 2A, and again showing the particle distribution of the ejected particles of all particle sizes at the said downstream position. The much wider dispersion of particles in the gas stream achieved by the invention will be evident.

FIGS. 8 and 9, which are each schematic top plan views of the lance particle tracks, again show the much greater dispersion achieved by use of the invention (FIG. 9) as compared with the use in FIG. 8 of the prior art lance of FIGS. 1 and 1A.

The Figures illustrate how the present invention generates a low pressure (i.e. low velocity) zone in the area where the lance pipe is located. The orifices 20 in the present invention are placed within this low pressure zone generated by baffle 22. Positioning the orifices within the low pressure zone provides the added benefit of reducing air pressure requirements if the injected particles are pneumatically conveyed. This low pressure zone results in a turbulence plume. It is this turbulence plume that results in the marked improvement in dispersion of the particulate in comparison to the prior art.

While the present invention has been set forth in terms of specific embodiments thereof, it will be appreciated that in view of the present disclosure, numerous variations upon the invention are now enabled to those skilled on the art, which variations yet reside within the present teachings. Accordingly the invention is to be broadly construed, and limited only by the scope and spirit of the disclosure and of the claims now appended hereto.

The invention claimed is:

1. In combination with a fluid treatment system which includes a flow duct in which a fluid stream flowing through the duct is mixed with a treating agent; a dispersion lance for dispersing the treating agent into said fluid stream, comprising: a pipe mounted in said duct with its axis approximately transverse to the direction of the fluid stream flow, said pipe having a series of openings along its length for injecting a treating agent supplied to said pipe into the fluid stream; a baffle extending lengthwise along said pipe, said baffle having a cross-section the central portion of which is V-shaped, with the apex of the V facing upstream of the fluid stream flow, and with generally flattened wing portions extending from the legs of the V beyond the sides of said pipe in a direction where they transversely intersect the stream flow, the said wings forming an angle of less than 180.degree. with respect to the legs of the said central portion; the said baffle acting to generate a low pressure zone on its downstream side which enhances turbulence in the fluid; and wherein the openings of said pipe are located to inject said treating agent into the said low pressure zone to better distribute and intermix the injected treating agent into the surrounding fluid.

2. A combination in accordance with claim 1, wherein said fluid comprises a gas.

3. A combination in accordance with claim 2 wherein said treating agent comprises a particulate.

4. A combination in accordance with claim 3, wherein said particulate comprises solid particles.

5. A combination in accordance with claim 2, wherein said treating agent comprises a liquid.

6. A combination in accordance with claim 2, wherein said treating agent comprises a gas.

7. A combination in accordance with claim 1, wherein said fluid comprises a liquid.

8. A combination on accordance with claim 7, wherein said treating agent comprises a particulate.

9. A combination in accordance with claim 8, wherein said particulate comprises solid particles.

10. A combination in accordance with claim 7, wherein said treating agent comprises a liquid.

11. A combination in accordance with claim 7, wherein said treating agent comprises a gas.

12. The combination of claim 1, wherein the apex of said central portion V subtends an angle of from about 30 to 135°.

13. The combination of claim 12, wherein the apex of said V subtends an angle Of about 90°.

14. The combination of claim 1, wherein said wings have a generally rectangular shape.

15. The combination of claim 14, wherein said wings are provided with notches on their trailing edges.

16. In a fluid treatment system which includes a flow duct in which a fluid stream flowing through the duct is mixed with a treating agent; a method for dispersing the treating agent into said fluid stream, comprising: mounting a pipe in said duct with its axis approximately transverse to the direction of the fluid stream flow, said pipe having a series of openings along its length for injecting a said treating agent supplied to said pipe into the fluid stream; a baffle extending lengthwise along said pipe, said baffle having a cross-section the central portion of which is V-shaped, with the apex of the V facing upstream of the fluid stream flow, and with generally flattened wing portions extending from the legs of the V beyond the sides of said pipe in a direction where they transversely intersect the stream flow, the said wings forming an angle of less than 180.degree. with respect to the legs of the said central portion; the said baffle acting to generate a low pressure zone on its downstream side which enhances turbulence in the fluid; and wherein the openings of said pipe are located to inject said treating agent into the said low pressure zone to better distribute and intermix the injected treating agent into the surrounding fluid.

17. A method in accordance with claim 16, wherein said fluid comprises a gas.

18. A method in accordance with claim 17 wherein said treating agent comprises a particulate.

19. A method in accordance with claim 18, wherein said particulate comprises solid particles.

20. A method in accordance with claim 17, wherein said treating agent comprises a liquid.

21. A method in accordance with claim 17, wherein said treating agent comprises a gas.

22. A method in accordance with claim 16, wherein said fluid comprises a liquid.

23. A method on accordance with claim 22, wherein said treating agent comprises a particulate.

24. A method in accordance with claim 23, wherein said particulate comprises solid particles.

25. A method in accordance with claim 22, wherein said treating agent comprises a liquid.

26. A method in accordance with claim 22, wherein said treating agent comprises a gas.

* * * * *